(12) United States Patent
Manohar et al.

(10) Patent No.: US 9,100,192 B2
(45) Date of Patent: Aug. 4, 2015

(54) APPARATUS AND METHOD FOR PROVISIONING AN ENDORSEMENT KEY CERTIFICATE FOR A FIRMWARE TRUSTED PLATFORM MODULE

(71) Applicant: QUALCOMM Incorporated, San Diego, CA (US)

(72) Inventors: Bollapragada Venkata Janaki Manohar, San Diego, CA (US); Ashish Grover, San Diego, CA (US); Eamonn Coleman, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/037,050

(22) Filed: Sep. 25, 2013

(65) Prior Publication Data
US 2014/0365763 A1    Dec. 11, 2014

Related U.S. Application Data

(60) Provisional application No. 61/832,678, filed on Jun. 7, 2013.

(51) Int. Cl.
| | |
|---|---|
| H04L 29/06 | (2006.01) |
| H04L 9/32 | (2006.01) |
| G06F 21/53 | (2013.01) |
| G06F 21/57 | (2013.01) |
| G06F 21/72 | (2013.01) |

(52) U.S. Cl.
CPC .............. *H04L 9/3263* (2013.01); *G06F 21/53* (2013.01); *G06F 21/572* (2013.01); *G06F 21/72* (2013.01)

(58) Field of Classification Search
CPC ...... H04L 9/3263; G06F 21/53; G06F 21/572
USPC .......................................................... 713/156
See application file for complete search history.

(56) References Cited

U.S. PATENT DOCUMENTS

| | | | |
|---|---|---|---|
| 8,127,124 | B2 | 2/2012 | Proudler |
| 8,176,336 | B1 | 5/2012 | Mao et al. |
| 8,375,221 | B1 | 2/2013 | Thom et al. |
| 2005/0144440 | A1 | 6/2005 | Catherman et al. |
| 2005/0246552 | A1* | 11/2005 | Bade et al. ............... 713/193 |

(Continued)

FOREIGN PATENT DOCUMENTS

WO    WO-2011139135 A1    11/2011

OTHER PUBLICATIONS

International Search Report and Written Opinion—PCT/US2014/036844—ISA/EPO—Aug. 27, 2014.

*Primary Examiner* — Mohammad W Reza
(74) *Attorney, Agent, or Firm* — Loza & Loza, LLP

(57) ABSTRACT

Disclosed is a method for provisioning an endorsement key (EK) certificate for a firmware trusted platform module (fTPM). In the method, the fTPM receives a derived key (DK) from a hardware trusted platform (HWTP). The fTPM is implemented in the HWTP, the DK is derived from a hardware key (HWK) securely stored in the HWTP, the HWK is unique to the HWTP, and the HWK is not available to the fTPM. The fTPM generates an endorsement primary seed (EPS) based on the DK, and generates a hashed endorsement primary seed (HEPS) based on a hash of the EPS. The fTPM forwards the HEPS to a provisioning station, and receives, from the provisioning station, an EK certificate corresponding to the HEPS.

34 Claims, 7 Drawing Sheets

(56) References Cited

U.S. PATENT DOCUMENTS

| | | |
|---|---|---|
| 2006/0020781 A1 | 1/2006 | Scarlata et al. |
| 2007/0016801 A1* | 1/2007 | Bade et al. ............ 713/193 |
| 2008/0244569 A1* | 10/2008 | Challener et al. ............ 718/1 |
| 2009/0083539 A1 | 3/2009 | Catherman et al. |
| 2010/0281273 A1 | 11/2010 | Lee et al. |
| 2012/0137137 A1* | 5/2012 | Brickell et al. ............ 713/182 |

* cited by examiner

APPARATUS AND METHOD FOR PROVISIONING AN ENDORSEMENT KEY CERTIFICATE FOR A FIRMWARE TRUSTED PLATFORM MODULE

CROSS-REFERENCE TO RELATED APPLICATION

This application claims the benefit of U.S. Provisional Application No. 61/832,678, filed Jun. 7, 2013, which application is incorporated herein by reference.

BACKGROUND

1. Field

The present invention relates generally to provisioning an endorsement primary seed (EPS) and an endorsement key certificate for a firmware trusted platform module (fTPM).

2. Background

An EPS is a fixed-size random value fixed/bound to a particular trusted platform module (TPM). The EPS value is a secret. The endorsement key (EK) is an asymmetric key pair (e.g., RSA/ECCkey) generated using the EPS. The private component of this asymmetric key is a secret. A corresponding EK certificate (EKCert) is generated and signed by a Certificate Authority that vouches for the corresponding EK. The manufacturer of each TPM (a hardware module) provisions a unique EPS and corresponding EKCert into each TPM.

For a firmware TPM (fTPM), nonvolatile (NV) storage is not available until an original equipment manufacturer (OEM) boots up the device using the TPM. Thus, the TPM manufacturer has no way to provision the EPS and corresponding EKCert in the factory. Storing the fTPM's unique EPS and EKCert (signature) in fuses would require hardware changes.

During device initialization (or when needed) the TPM uses the EPS to generate the EK. The TPM can present the corresponding stored EKCert to another entity, and that entity can determine with certainty that they are communicating with a specific TPM. The EPS and private EK are security sensitive and should not be leaked during and after provisioning to the TPM.

For such hardware-based TPMs, when the hardware is created, the EK and certificate pairs are generated on the factory floor and fused inside the TPM's emmc/fuses/ROM that is only accessible to the TPM. The TPM, by design, is not supposed to leak the private information.

A problem with the fTPM is that it is software running in a secure kernel (TrustZone or other such environments) and it loads and runs on a standard CPU. Since it is all in software, device unique keys cannot be provisioned in the software. Also, it is especially challenging due to time-consuming secure generation of the EPS, EK, and EKCert, and to provision these when the final device (e.g., mobile phone, tablet, or other such device) is made in the factory.

There is therefore a need for a technique for provisioning an EKCert for an fTPM.

SUMMARY

An aspect of the present invention may reside in a method for provisioning an endorsement key (EK) certificate for a firmware trusted platform module (fTPM). In the method, a derived key (DK) is received from a hardware trusted platform (HWTP). The fTPM is implemented in the HWTP, the DK is derived from a hardware key (HWK) securely stored in the HWTP, the HWK is unique to the HWTP, and the HWK is not available to the fTPM. An endorsement primary seed (EPS) is generated based on the DK, and a hashed endorsement primary seed (HEPS) is generated based on a hash of the EPS. The HEPS is forwarded to a provisioning station, and receives, from the provisioning station, an EK certificate corresponding to the HEPS.

In more detailed aspects of the invention, a public key and private key comprising the EK may be generated, and the EK certificate may have the public key. Also, the EK certificate may be stored in secure nonvolatile memory of the HWTP that is available only to the fTPM. Further, the provisioning station may have a database of HEPSs and corresponding EK certificates. Each HEPS and corresponding EK certificate is associated with only one particular fTPM.

Another aspect of the invention may reside in a station, comprising: means for receiving a derived key (DK) from a hardware trusted platform (HWTP), wherein the means for receiving the DK is implemented in the HWTP, the DK is derived from a hardware key (HWK) securely stored in the HWTP, the HWK is unique to the HWTP, and the HWK is not available to the means for receiving the DK; means for generating an endorsement primary seed (EPS) based on the DK; means for generating a hashed endorsement primary seed (HEPS) based on a hash of the EPS; means for forwarding the HEPS to a provisioning station; and means for receiving, from the provisioning station, an EK certificate corresponding to the HEPS.

Another aspect of the invention may reside in a station, comprising: a processor configured to: receive a derived key (DK) from a hardware trusted platform (HWTP), wherein the DK is derived from a hardware key (HWK) securely stored in the HWTP, the HWK is unique to the HWTP, and the HWK is not available to a firmware trusted platform module (fTPM); generate an endorsement primary seed (EPS) based on the DK; generate a hashed endorsement primary seed (HEPS) based on a hash of the EPS; forward the HEPS to a provisioning station; and receive, from the provisioning station, an EK certificate corresponding to the HEPS.

Another aspect of the invention may reside in a computer program product, comprising: computer-readable medium, comprising: code for causing a computer to receive a derived key (DK) from a hardware trusted platform (HWTP), wherein a firmware trusted platform module (fTPM) is implemented in the HWTP, the DK is derived from a hardware key (HWK) securely stored in the HWTP, the HWK is unique to the HWTP, and the HWK is not available to the fTPM; code for causing a computer to generate an endorsement primary seed (EPS) based on the DK; code for causing a computer to generate a hashed endorsement primary seed (HEPS) based on a hash of the EPS; code for causing a computer to forward the HEPS to a provisioning station; and code for causing a computer to receive an EK certificate corresponding to the HEPS from the provisioning station.

Another aspect of the present invention may reside in a method for generating an endorsement key (EK) certificate and a hashed endorsement primary seed (HEPS) at a secure facility. In the method, an encrypted derived key E[DK] for a particular hardware trusted platform (HWTP) is received. The derived key (DK) is derived from a hardware key HWK that is unique to the HWTP. The E[DK] is decrypted using a private key for the secure facility to generate the DK. A endorsement primary seed (EPS) is generated based on the DK. The hashed endorsement primary seed (HEPS) is generated based on a hash of the EPS. The endorsement key (EK) is generated based on the EPS. A public portion of the EK is signed to generate the EK certificate. The HEPS and the EK certificate are associated in a database.

In more detailed aspects of the invention, the size of the EPS may be fixed and may depend on an algorithm used to generate the EK based on the EPS. The EK certificate may be for a firmware trusted platform module (fTPM) that is associated with the HWTP with the unique HWK. The database may be sent to at least one original equipment manufacture (OEM) for provisioning the fTPM with the EK certificate. The EK may comprise a public key and a private key, and the EK certificate may include the public key.

Another aspect of the invention may reside in a station, comprising: means for receiving an encrypted derived key E[DK] for a particular hardware trusted platform (HWTP), wherein the derived key (DK) is derived from a hardware key HWK that is unique to the HWTP; means for decrypting the E[DK] using a private key for a secure facility to generate the DK; means for generating an endorsement primary seed (EPS) based on the DK; means for generating a hashed endorsement primary seed (HEPS) based on a hash of the EPS; means for generating an endorsement key (EK) based on the EPS; means for signing a public portion of the EK to generate the EK certificate; and means for associating the HEPS and the EK certificate in a database.

Another aspect of the invention may reside in a station, comprising: a processor configured to: receive an encrypted derived key E[DK] for a hardware trusted platform (HWTP), wherein the derived key (DK) is derived from a hardware key HWK that is unique to the HWTP; decrypt the E[DK] using a private key for a secure facility to generate the DK; generate an endorsement primary seed (EPS) based on the DK; generate a hashed endorsement primary seed (HEPS) based on a hash of the EPS; generate an endorsement key (EK) based on the EPS; sign a public portion of the EK to generate the EK certificate; and associate the HEPS and the EK certificate in a database.

Another aspect of the invention may reside in a computer program product, comprising: computer-readable medium, comprising: code for causing a computer to receive an encrypted derived key E[DK] for a hardware trusted platform (HWTP), wherein the derived key (DK) is derived from a hardware key HWK that is unique to the HWTP; code for causing a computer to decrypt the E[DK] using a private key for the secure facility to generate the DK; code for causing a computer to generate an endorsement primary seed (EPS) based on the DK; code for causing a computer to generate a hashed endorsement primary seed (HEPS) based on a hash of the EPS; code for causing a computer to sign a public portion of the EK to generate the EK certificate; and code for causing a computer to associate the HEPS and the EK certificate in a database.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
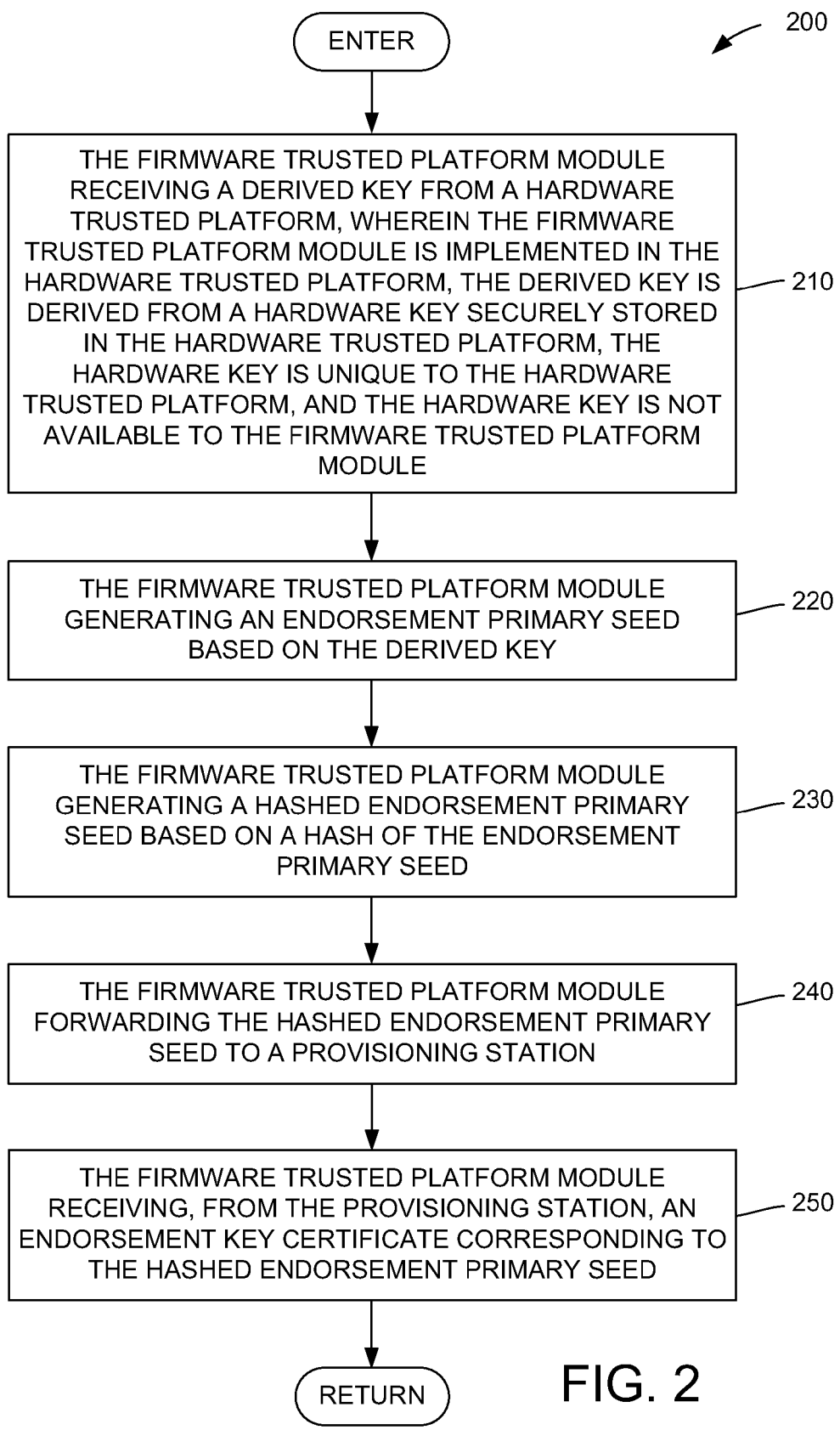
FIG. 2 is a flow diagram of a method for provisioning an endorsement key certificate for a firmware trusted platform module, according to the present invention.
Figure 3:
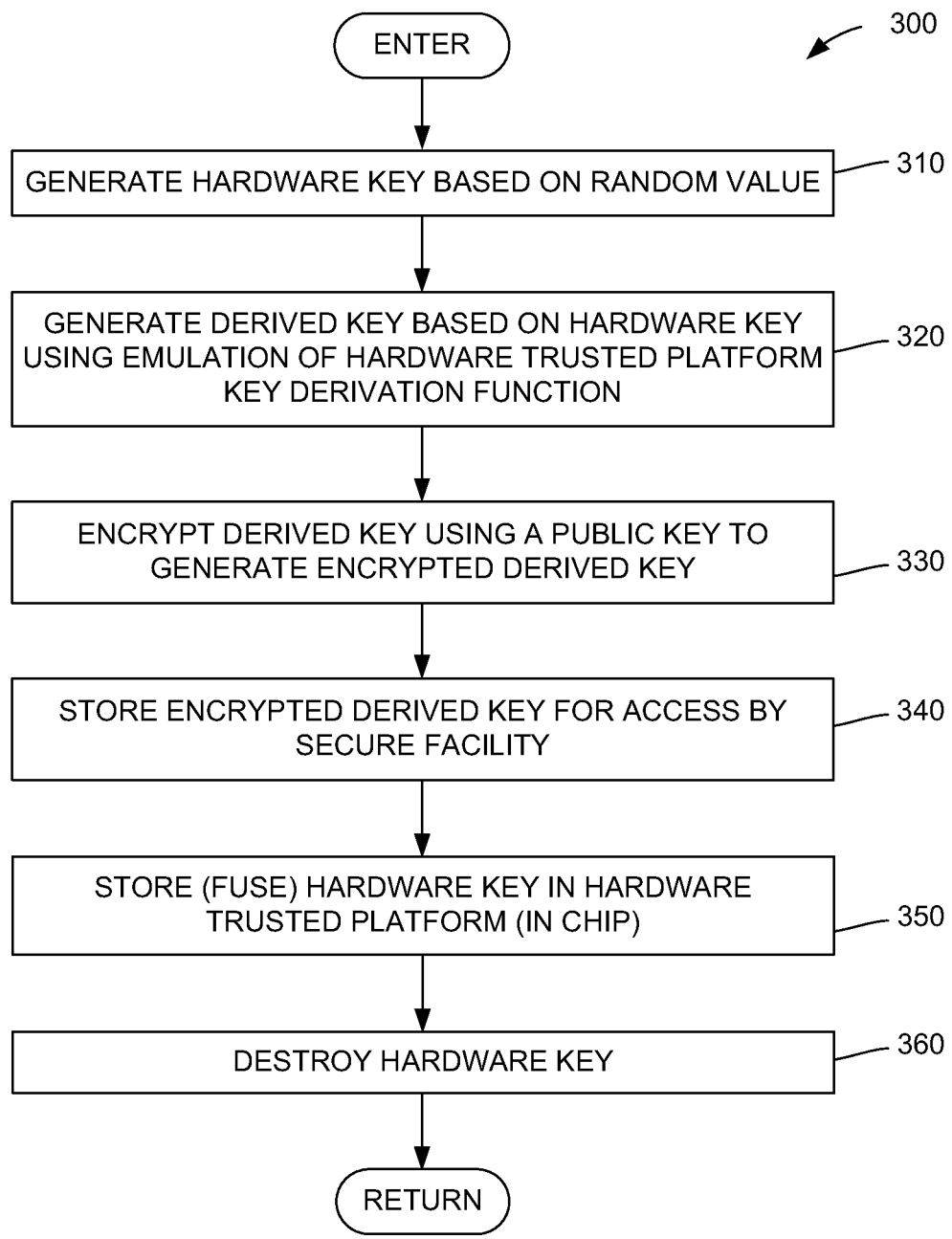
FIG. 3 is a flow diagram of a method for generating a derived key from a hardware key and encrypting the derived key.

With reference to FIGS. 2 and 3, an aspect of the present invention may reside in a method 200 for provisioning an endorsement key (EK) certificate for a firmware trusted platform module (fTPM). In the method, the fTPM receives a derived key (DK) from a hardware trusted platform (HWTP) 820 (step 210). The fTPM is implemented in the HWTP, the DK is derived from a hardware key (HWK) securely stored in the HWTP, the HWK is unique to the HWTP, and the HWK is not available to the fTPM. The fTPM generates an endorsement primary seed (EPS) based on the DK (step 220), and generates a hashed endorsement primary seed (HEPS) based on a hash of the EPS (step 230). The fTPM forwards the HEPS to a provisioning station (step 240), and receives, from the provisioning station, an EK certificate corresponding to the HEPS (step 250).

In more detailed aspects of the invention, the fTPM may generate a public key and private key comprising the EK, and the EK certificate may have the public key. Also, the fTPM may store the EK certificate in secure nonvolatile (NV) memory of the HWTP that is available only to the fTPM. Further, the provisioning station may have a database (DB) of HEPSs and corresponding EK certificates. Each HEPS and corresponding EK certificate is associated with only one particular fTPM.

Figure 8:
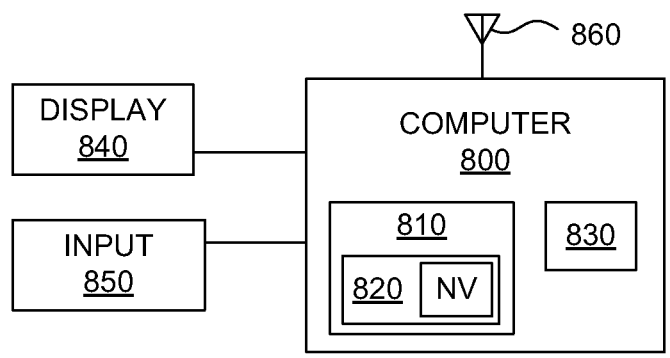
FIG. 8 is a block diagram of a computer including a memory and a processor with a trusted platform.

With further reference to FIG. 8, another aspect of the invention may reside in a station (e.g., computer 800), comprising: means 810 for receiving a derived key (DK) from a hardware trusted platform (HWTP) 820, wherein the means 810 for receiving the DK is implemented in the HWTP, the DK is derived from a hardware key (HWK) securely stored in the HWTP, the HWK is unique to the HWTP, and the HWK is not available to the means for receiving the DK; means 810 for generating an endorsement primary seed (EPS) based on the DK; means 810 for generating a hashed endorsement primary seed (HEPS) based on a hash of the EPS; means 810 for forwarding the HEPS to a provisioning station; and means 810 for receiving, from the provisioning station, an EK certificate corresponding to the HEPS.

Another aspect of the invention may reside in a station, comprising: a processor 810 having a hardware trusted platform (HWTP) 820 configured to implement a firmware trusted platform module (fTPM), wherein: the fTPM receives a derived key (DK) from a hardware trusted platform (HWTP), wherein the DK is derived from a hardware key (HWK) securely stored in the HWTP, the HWK is unique to the HWTP, and the HWK is not available to the fTPM; the fTPM generates an endorsement primary seed (EPS) based on the DK; the fTPM generates a hashed endorsement primary seed (HEPS) based on a hash of the EPS; the fTPM forwards the HEPS to a provisioning station; and the fTPM receives, from the provisioning station, an EK certificate corresponding to the HEPS.

Another aspect of the invention may reside in a computer program product, comprising: computer-readable medium 830, comprising: code for causing a computer 800 to receive a derived key (DK) from a hardware trusted platform (HWTP) 820, wherein a firmware trusted platform module (fTPM) is implemented in the HWTP, the DK is derived from a hardware key (HWK) securely stored in the HWTP, the HWK is unique to the HWTP, and the HWK is not available to the fTPM; code for causing a computer to generate an endorsement primary seed (EPS) based on the DK; code for causing a computer to generate a hashed endorsement primary seed (HEPS) based on a hash of the EPS; code for causing a computer to forward the HEPS to a provisioning station; and code for causing a computer to receive an EK certificate corresponding to the HEPS from the provisioning station.

The fTPM runs in a secure environment such as a TrustZone of the ARM architecture. The fTPM has access to secure/encrypted NV memory when device is operating (e.g., TrustZone NV memory that has its contents encrypted). A unique hardware key (HWK) is fused to each chip during chip manufacture that is only accessible to hardware blocks.

With reference to FIG. 3, the TPM (chip) manufacturer generates the HWK from a random value (step 310). The DK is generated based on the HWK using an emulation of a hardware key derivation function (KDF) of the TPM (step 320). The DK is encrypted using a secure facility's public key to generate an encrypted DK (E[DK]) (step 330). The E[DK] is sent to a secure facility for later access (step 340). The HWK may be stored in the chip by fusing the HWK to the chip (step 350). The TPM (chip) manufacturer then destroys the HWK and the DK (step 360).

Figure 4:
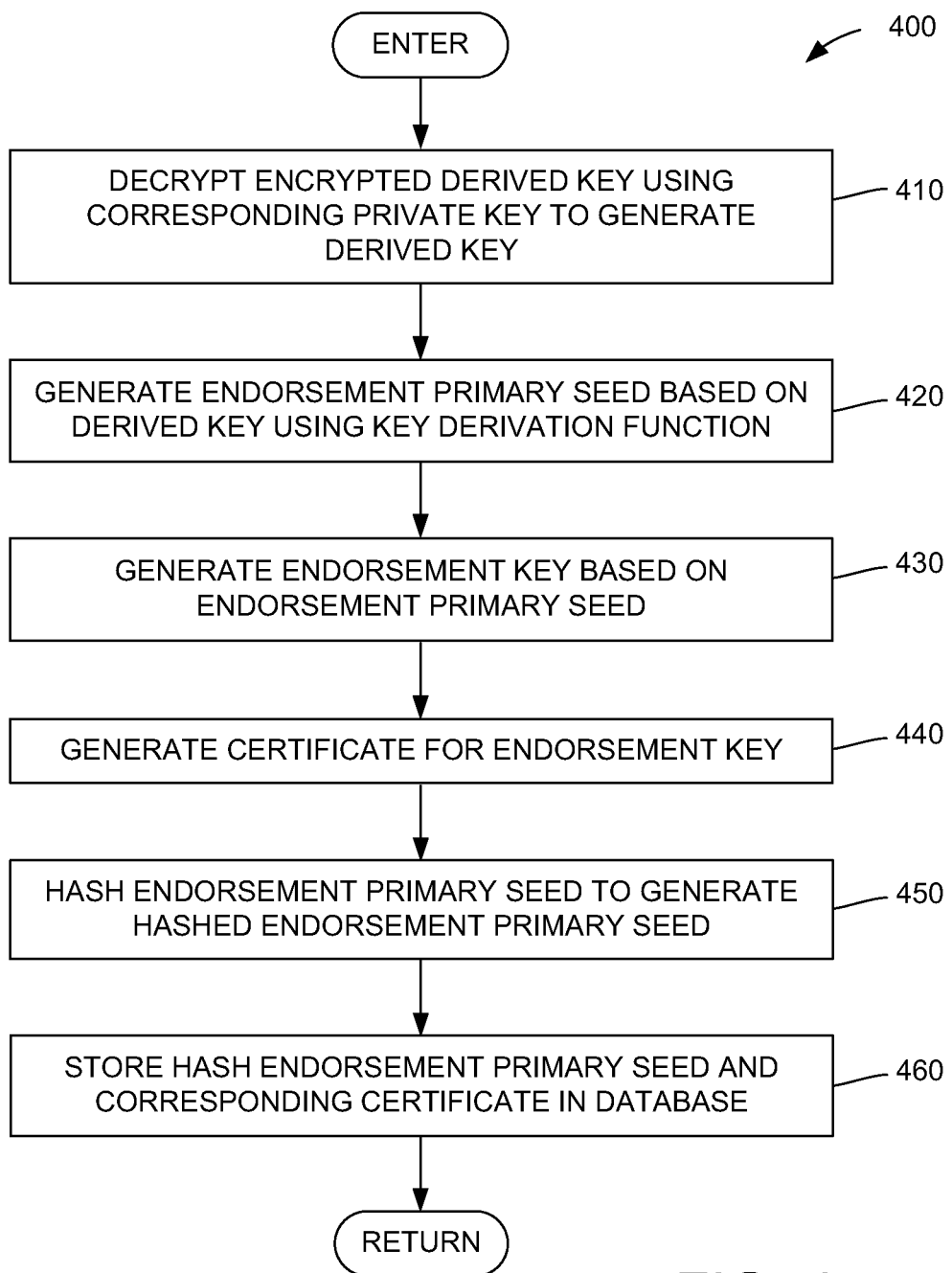
FIG. 4 is a flow diagram of a method for generating, at a secure facility, a hashed endorsement primary seed and a corresponding endorsement key certificate for storage in a database.

With reference to FIG. 4, the secure facility receives the E[DK] for each TPM (i.e., HWTP) manufactured: The secure facility decrypts the DK using the secure facility's private key (step 410). The secure facility uses a software KDF to generate the EPS (typically 32 bytes) from the DK (step 420). The size of the EPS is fixed and depends on the algorithm used to perform the actual asymmetric EK key generation. The secure facility generates the EK based on the EPS (step 430), and signs the public portion of the EK to create the EKCert (step 440). The secure facility hashes the EPS to generate a hashed EPS (HEPS) (step 450). The secure facility stores the HEPS and corresponding EKCert in a database (step 460). This process is repeated for each TPM to generate unique pairs of HEPSs and EKCerts. The database from the secure facility is sent to customers/OEMs.

Figure 5:
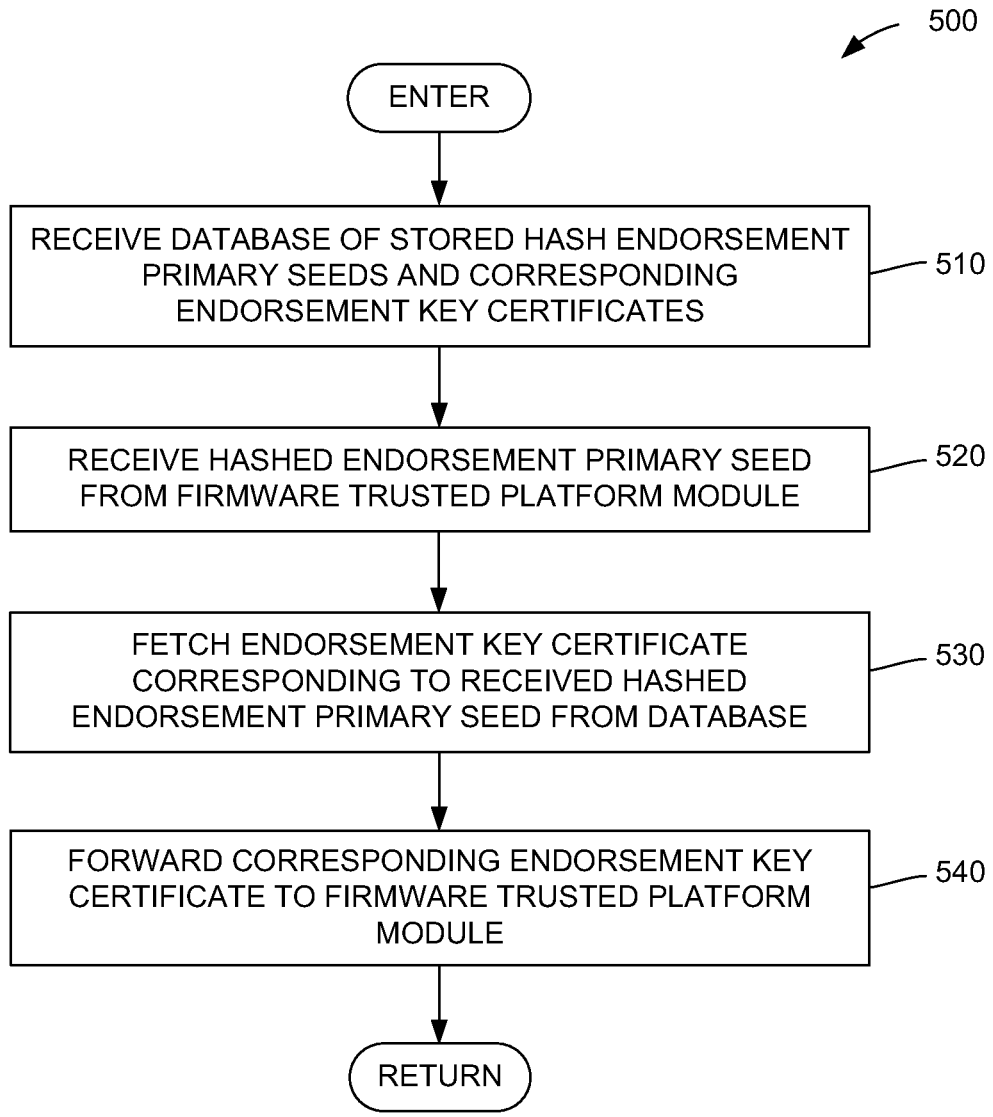
FIG. 5 is a flow diagram of a method for fetching and forwarding an endorsement key certificate corresponding to a received hashed endorsement primary seed.

With reference to FIG. 5, the OEMs will make devices incorporating the chips with the TPMs inside on their manufacture line. Each OEM receives the database of stored HEPSs and corresponding EKCerts from the chip manufacturer (step 510). During a first boot/provisioning step, fTPM will use a KDF on the DK to derive the unique EPS. The fTPM will hash the EPS and provide the HEPS to the provisioning software at a computer station operated by the OEM (step 520). The provisioning software/application will look up the EKcert matching the HEPS (step 530), and forward it to the fTPM (step 540). The fTPM may provision the certificate in a public portion of TPM's NV memory that is available only to the fTPM.

Figure 6:
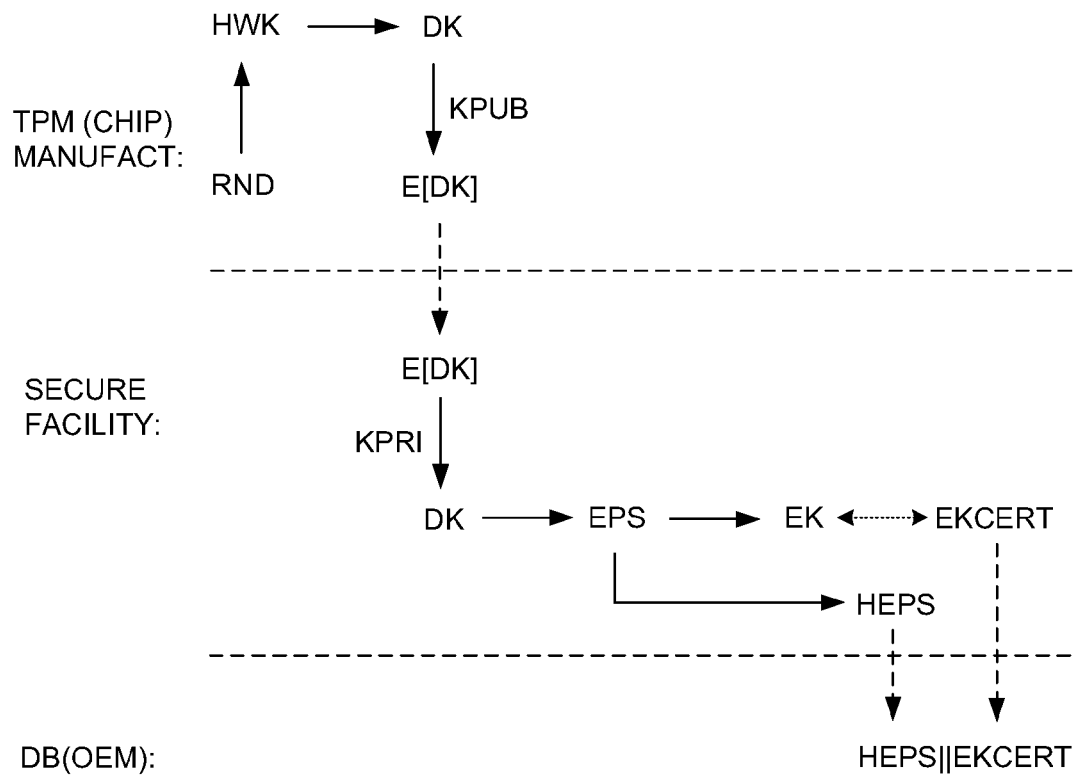
FIG. 6 is a schematic diagram of hierarchy of keys and seeds for a method of generating a database of hashed endorsement primary seeds and corresponding endorsement key certificates.

With reference to FIG. 6, the TPM manufacturer generates the encrypted DK for each TPM. A secure facility (typically operated by the TPM manufacturer away from the factory floor) generates a database of the HEPSs and EKCerts. The OEM receives the database which does not include the secret elements: the HWK, DK, EPS, and private EK. The database may cover hundred of thousands, or millions, or chips. Without the HEPS, matching an EKCert to a particular chip would entail random guessing.

Figure 7:
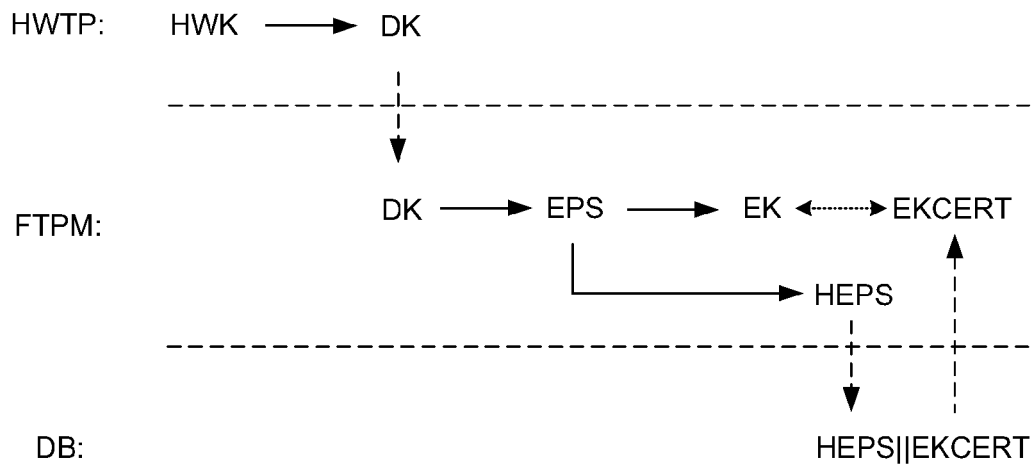
FIG. 7 is a schematic diagram of hierarchy of keys and seeds for a method for provisioning an endorsement primary seed and corresponding endorsement key certificate for a firmware trusted platform module.

With reference to FIG. 7, the relationship of an HEPS to the HWK and DK of a particular HWTP is shown. The HEPS does not reveal the stored secrets, and acts as a type of index that allows identification of the corresponding EKCert in the database.

Accordingly, the time consuming part of the EK generation may be done whenever it is needed in field and not part of a device's manufacture process. This eliminates the need to perform the time consuming step of EK (asymmetric key pair, e.g., RSA key pair) generation at the OEM factory floor. Also, the OEMs do not need to maintain/operate a service to sign the EK certificates. Further, the OEMs do not need to have a secure facility to do the provisioning for their devices.

The remote station 102 may comprise a computer 800 that includes a processor 810 having a TPM 820, a storage medium 830 such as memory and/or a disk drive, a display 840, and an input such as a keypad 850, and a wireless connection 860.

Figure 9:
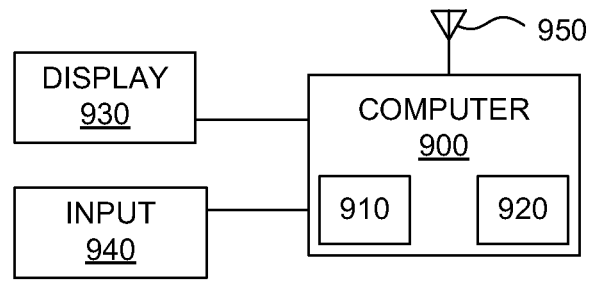
FIG. 9 is a block diagram of a secure facility computer including a processor and a memory.

With reference to FIG. 9, the secure facility may include a computer 900 that includes a processor 910, a storage medium 920 such as memory and/or a disk drive, a display 930, and an input 940 such as a keypad, and a network/internet connection 950.

Another aspect of the invention may reside in a station (e.g., computer 900), comprising: means 910 for receiving an encrypted derived key E[DK] for a particular hardware trusted platform (HWTP), wherein the derived key (DK) is derived from a hardware key HWK that is unique to the HWTP; means 910 for decrypting the E[DK] using a private key for a secure facility to generate the DK; means 910 for generating an endorsement primary seed (EPS) based on the DK; means 910 for generating a hashed endorsement primary seed (HEPS) based on a hash of the EPS; means 910 for generating an endorsement key (EK) based on the EPS; means 910 for signing a public portion of the EK to generate the EK certificate; and means 910 for associating the HEPS and the EK certificate in a database.

Another aspect of the invention may reside in a station (e.g., computer 900), comprising: a processor 910 configured to: receive an encrypted derived key E[DK] for a hardware trusted platform (HWTP), wherein the derived key (DK) is derived from a hardware key HWK that is unique to the HWTP; decrypt the E[DK] using a private key for a secure facility to generate the DK; generate an endorsement primary seed (EPS) based on the DK; generate a hashed endorsement primary seed (HEPS) based on a hash of the EPS; generate an endorsement key (EK) based on the EPS; sign a public portion of the EK to generate the EK certificate; and associate the HEPS and the EK certificate in a database.

Another aspect of the invention may reside in a computer program product, comprising: computer-readable medium 920, comprising: code for causing a computer 900 to receive an encrypted derived key E[DK] for a hardware trusted platform (HWTP), wherein the derived key (DK) is derived from a hardware key HWK that is unique to the HWTP; code for causing a computer 900 to decrypt the E[DK] using a private key for the secure facility to generate the DK; code for causing a computer 900 to generate an endorsement primary seed (EPS) based on the DK; code for causing a computer 900 to generate a hashed endorsement primary seed (HEPS) based on a hash of the EPS; code for causing a computer 900 to sign a public portion of the EK to generate the EK certificate; and code for causing a computer 900 to associate the HEPS and the EK certificate in a database.

Figure 1:
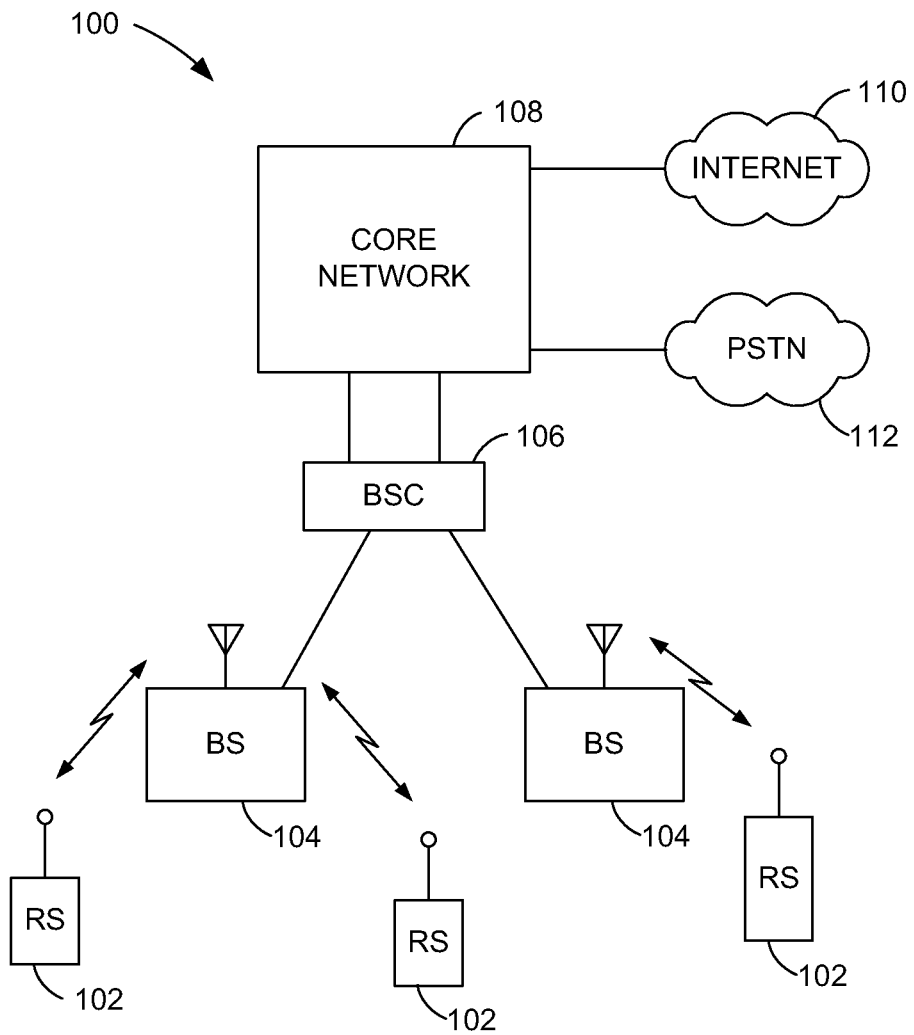
FIG. 1 is a block diagram of an example of a wireless communication system.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for provisioning an endorsement key (EK) certificate for a firmware trusted platform module (fTPM), comprising:
    receiving a derived key (DK) from a hardware trusted platform (HWTP), wherein the fTPM is implemented in the HWTP, the DK is derived from a hardware key (HWK) securely stored in the HWTP, the HWK is unique to the HWTP, and the HWK is not available to the fTPM
    generating an endorsement primary seed (EPS) based on the DK;
    generating a hashed endorsement primary seed (HEPS) based on a hash of the EPS;
    forwarding the HEPS to a provisioning station; and
    receiving, from the provisioning station, an EK certificate corresponding to the HEPS.

2. The method of claim 1, further comprising:
generating a public key and private key comprising an EK, wherein the EK certificate has the public key.

3. The method of claim 1, further comprising:
storing the EK certificate in secure nonvolatile memory of the HWTP that is available only to the fTPM.

4. The method of claim 1, wherein the provisioning station has a database of HEPSs and corresponding EK certificates, and wherein each HEPS and corresponding EK certificate is associated with only one particular fTPM.

5. A station, comprising:
means for receiving a derived key (DK) from a hardware trusted platform (HWTP), wherein the means for receiving the DK is implemented in the HWTP, the DK is derived from a hardware key (HWK) securely stored in the HWTP, the HWK is unique to the HWTP, and the HWK is not available to the means for receiving the DK;
means for generating an endorsement primary seed (EPS) based on the DK;
means for generating a hashed endorsement primary seed (HEPS) based on a hash of the EPS;
means for forwarding the HEPS to a provisioning station; and
means for receiving, from the provisioning station, an endorsement key (EK) certificate corresponding to the HEPS.

6. The station of claim 5, further comprising:
means for generating a public key and private key comprising an EK, wherein the EK certificate has the public key wherein the deterministic function includes a hash function.

7. The station of claim 5, further comprising:
means for storing the EK certificate in secure nonvolatile memory of the HWTP.

8. A station, comprising:
a processor, implemented as hardware, configured to:
receive a derived key (DK) from a hardware trusted platform (HWTP), wherein the DK is derived from a hardware key (HWK) securely stored in the HWTP, the HWK is unique to the HWTP, and the HWK is not available to a firmware trusted platform module (fTPM);
generate an endorsement primary seed (EPS) based on the DK;
generate a hashed endorsement primary seed (HEPS) based on a hash of the EPS;
forward the HEPS to a provisioning station; and
receive, from the provisioning station, an endorsement key (EK) certificate corresponding to the HEPS.

9. The station of claim 8, wherein the fTPM generates a public key and private key comprising an EK, and the EK certificate has the public key.

10. The station of claim 8, wherein the fTPM stores the EK certificate in secure nonvolatile memory of the HWTP that is available only to the fTPM.

11. The station of claim 8, wherein the provisioning station has a database of HEPSs and corresponding EK certificates, and wherein each HEPS and corresponding EK certificate is associated with only one particular fTPM.

12. A non-transitory computer-readable medium, comprising:
code for causing a computer to receive a derived key (DK) from a hardware trusted platform (HWTP), wherein a firmware trusted platform module (fTPM) is implemented in the HWTP, the DK is derived from a hardware key (HWK) securely stored in the HWTP, the HWK is unique to the HWTP, and the HWK is not available to the fTPM;
code for causing a computer to generate an endorsement primary seed (EPS) based on the DK;
code for causing a computer to generate a hashed endorsement primary seed (HEPS) based on a hash of the EPS;
code for causing a computer to forward the HEPS to a provisioning station; and
code for causing a computer to receive an endorsement key (EK) certificate corresponding to the HEPS from the provisioning station.

13. The non-transitory computer-readable medium of claim 12, further comprising:
code for causing a computer to generate a public key and private key comprising an EK, wherein the EK certificate has the public key wherein the deterministic function includes a hash function.

14. The non-transitory computer-readable medium of claim 12, further comprising:
code for causing a computer to store the EK certificate in secure nonvolatile memory of the HWTP that is available only to the fTPM.

15. A method for generating an endorsement key (EK) certificate and a hashed endorsement primary seed (HEPS) at a secure facility, comprising:
receiving an encrypted derived key E[DK] for a particular hardware trusted platform (HWTP), wherein the derived key (DK) is derived from a hardware key HWK that is unique to the HWTP;
decrypting the E[DK] using a private key for the secure facility to generate the DK;
generating an endorsement primary seed (EPS) based on the DK;
generating the hashed endorsement primary seed (HEPS) based on a hash of the EPS;
generating an endorsement key (EK) based on the EPS;
signing a public portion of the EK to generate the EK certificate; and
associating the HEPS and the EK certificate in a database.

16. The method of claim 15, wherein a size of the EPS is fixed and depends on an algorithm used to generate the EK based on the EPS.

17. The method of claim 15, wherein the EK certificate is for a firmware trusted platform module (fTPM) that is associated with the HWTP with the unique HWK.

18. The method of claim 17, further comprising:
sending the database to at least one original equipment manufacture (OEM) for provisioning the fTPM with the EK certificate.

19. The method of claim 15, wherein:
the EK comprises a public key and a private key; and
the EK certificate includes the public key.

20. A station, comprising:
means for receiving an encrypted derived key E[DK] for a particular hardware trusted platform (HWTP), wherein the derived key (DK) is derived from a hardware key HWK that is unique to the HWTP;
means for decrypting the E[DK] using a private key for a secure facility to generate the DK;
means for generating an endorsement primary seed (EPS) based on the DK;
means for generating a hashed endorsement primary seed (HEPS) based on a hash of the EPS;
means for generating an endorsement key (EK) based on the EPS;

means for signing a public portion of the EK to generate an EK certificate; and means for associating the HEPS and the EK certificate in a database.

21. The station of claim 20, wherein a size of the EPS is fixed and depends on an algorithm used to generate the EK based on the EPS.

22. The station of claim 20, wherein the EK certificate is for a firmware trusted platform module (fTPM) that is associated with the HWTP with the unique HWK.

23. The station of claim 22, further comprising:
means for sending the database to at least one original equipment manufacture (OEM) for provisioning the fTPM with the EK certificate.

24. The station of claim 20, wherein:
the EK comprises a public key and a private key; and
the EK certificate includes the public key.

25. A station, comprising:
a processor, implemented as hardware, configured to:
receive an encrypted derived key E[DK] for a hardware trusted platform (HWTP), wherein the derived key (DK) is derived from a hardware key HWK that is unique to the HWTP;
decrypt the E[DK] using a private key for a secure facility to generate the DK;
generate an endorsement primary seed (EPS) based on the DK;
generate a hashed endorsement primary seed (HEPS) based on a hash of the EPS;
generate an endorsement key (EK) based on the EPS;
sign a public portion of the EK to generate an EK certificate; and
associate the HEPS and the EK certificate in a database.

26. The station of claim 25, wherein a size of the EPS is fixed and depends on an algorithm used to generate the EK based on the EPS.

27. The station of claim 25, wherein the EK certificate is for a firmware trusted platform module (fTPM) that is associated with the HWTP with the unique HWK.

28. The station of claim 27, wherein the processor is further configured to:
send the database to at least one original equipment manufacture (OEM) for provisioning the fTPM with the EK certificate.

29. The station of claim 25, wherein:
the EK comprises a public key and a private key; and
the EK certificate includes the public key.

30. A non-transitory computer-readable medium, comprising:
code for causing a computer to receive an encrypted derived key E[DK] for a hardware trusted platform (HWTP), wherein the derived key (DK) is derived from a hardware key HWK that is unique to the HWTP;
code for causing a computer to decrypt the E[DK] using a private key for a secure facility to generate the DK;
code for causing a computer to generate an endorsement primary seed (EPS) based on the DK;
code for causing a computer to generate a hashed endorsement primary seed (HEPS) based on a hash of the EPS;
code for causing a computer to generate an endorsement key (EK) based on the EPS;
code for causing a computer to sign a public portion of the EK to generate an EK certificate; and
code for causing a computer to associate the HEPS and the EK certificate in a database.

31. The non-transitory computer-readable medium of claim 30, wherein a size of the EPS is fixed and depends on an algorithm used to generate the EK based on the EPS.

32. The non-transitory computer-readable medium of claim 30, wherein the EK certificate is for a firmware trusted platform module (fTPM) that is associated with the HWTP with the unique HWK.

33. The non-transitory computer-readable medium of claim 32, further comprising:
code for causing a computer to send the database to at least one original equipment manufacture (OEM) for provisioning the fTPM with the EK certificate.

34. The non-transitory computer-readable medium of claim 30, wherein:
the EK comprises a public key and a private key; and
the EK certificate includes the public key.

* * * * *